United States Patent
Wimmer et al.

(10) Patent No.: US 6,882,888 B2
(45) Date of Patent: Apr. 19, 2005

(54) CONFIGURATION OF A CONTROL SYSTEM FOR AN ELECTRICAL SWITCHGEAR ASSEMBLY

(75) Inventors: Wolfgang Wimmer, Rietheim (CH); Xiaobing Qiu, Zürich (CH)

(73) Assignee: ABB Schweiz AG, Baden (CH)

( * ) Notice: Subject to any disclaimer, the term of this patent is extended or adjusted under 35 U.S.C. 154(b) by 763 days.

(21) Appl. No.: 09/948,062

(22) Filed: Sep. 7, 2001

(65) Prior Publication Data

US 2002/0059477 A1 May 16, 2002

(30) Foreign Application Priority Data

Sep. 21, 2000 (EP) ............................................ 00810861

(51) Int. Cl.[7] ............................................. G05B 11/01
(52) U.S. Cl. ............................ 700/18; 700/17; 700/30; 700/31; 700/170; 700/286; 700/295; 701/58; 701/59; 701/54; 701/93; 717/120; 717/143
(58) Field of Search ............................ 700/29–31, 17, 700/18, 86, 87, 286, 295, 83, 170; 701/48, 58, 59, 64, 93; 717/120, 143; 703/18

(56) References Cited

U.S. PATENT DOCUMENTS 5,899,683 A * 5/1999 Nolte et al. .................... 431/25
6,032,203 A * 2/2000 Heidhues ...................... 710/11
6,442,452 B1 * 8/2002 Kopke .......................... 700/292
6,506,993 B1 * 1/2003 Gronemann et al. ........ 218/154
6,645,016 B1 * 11/2003 Andersen et al. ............. 440/6

FOREIGN PATENT DOCUMENTS

| EP | 0 224 711 | 1/1991 |
|----|-----------|--------|
| EP | 0 175 266 | 6/1996 |

OTHER PUBLICATIONS

M. Foley, "Object–Oriented On–Line Network Analysis," IEEE Transactions on Power Systems, Feb. 1, 2995, pp. 125–132.

* cited by examiner

*Primary Examiner*—Ramesh Patel
(74) *Attorney, Agent, or Firm*—Burns, Doane, Swecker & Mathis, L.L.P.

(57) ABSTRACT

A method for configuration of a control system for an electrical switchgear assembly uses a primary device model for representation of primary devices, and a topology model of the switchgear assembly. In order to configure a first control system function, the first control system function is allocated to a primary device and to a field device, after which the primary device model and the topology model are used to automatically determine second control system functions which the first control system function requires during operation.

8 Claims, 2 Drawing Sheets

CONFIGURATION OF A CONTROL SYSTEM FOR AN ELECTRICAL SWITCHGEAR ASSEMBLY

FIELD OF THE INVENTION

The invention relates to the field of system control technology, in particular to system control technology for high-voltage, medium-voltage or low-voltage switchgear assemblies. It relates to a method and a computer program product for configuration of a control system for an electrical switchgear assembly.

BACKGROUND OF THE INVENTION

A system, in particular a high-voltage or medium-voltage switchgear assembly, is controlled by a distributed system control system comprising field control devices which are connected to one another via communication buses. A plant or substation control system has, for example, field control devices and an operator station, together with various communication buses and bus couplers. The field devices control, regulate, monitor and protect primary devices in the system, which carry out the actual system purpose. Primary devices are, for example, switches, drives, generators or transformers, and bus couplers connect communication buses, which have different hardware and/or protocol characteristics, so that the communication buses together form a communication network. Individual software functions in the field devices use the communication network to communicate with one another and with functional elements or program elements of the operator devices. Software functions of the field devices, that is to say program elements, which can be stored in and carried out on a field device, are referred to in the following text as control system functional elements or, for short, as control system functions. The procedure for conventional methods for configuration of these control system functions and of their communication means is as follows: the field devices and their control system functions are each configured and dimensioned using their own engineering tools. The engineering tools use models for standardized representation of control system functions, for example in accordance with IEC Standard 61850. These models comprise, in particular, field device models, control function models and communication models, that is to say Standards for description of field devices, control system functions, etc. The standardized description allows field devices from different manufacturers to be configured jointly.

Interfaces between control system functions are described by signal lists. An integration tool is used to specify the links between individual signals. This requires knowledge of the nature and method of operation of the individual control system functions, and about the construction of the switchgear assembly. This specification is complex, and is susceptible to errors.

SUMMARY OF THE INVENTION

The object of the invention is therefore to provide a method and a computer program product for configuration of a control system for an electrical switchgear assembly of the type mentioned initially, which further automate the configuration process.

This object is achieved by a method and a computer program product for configuration of a control system for an electrical switchgear assembly having the features of patent claims 1 and 7.

The method according to the invention for configuration of a control system for an electrical switchgear assembly uses a primary device model and a topology model of the switchgear assembly. In order to configure a first control system function, this function is allocated to a primary device and a field device, after which the primary device model and the topology model are used to automatically determine second control system functions, whose data or procedures are required by the first control system function during operation of the system.

In one preferred variant of the invention, the communication links between the first control system function and the second control system functions are determined automatically on the basis of the communication model. In this case, the second control system functions are each either already allocated to the field devices, or can be allocated automatically.

Since the method according to the invention not only has a model of the field devices and control system functions but also has a model of their relationships to the primary devices and to the topology of the switchgear assembly, there is no need for complex association of signals to control system functions. Previously separate procedures for engineering of control system functions and communication means, as well as the specification of links between signals by means of an integration tool, are automated jointly in the method according to the invention.

In one preferred variant of the invention, the method is carried out when the switchgear assembly is in an off-line engineering phase. The method is used to determine configuration parameters for control system functions and communication units, which can be loaded into the corresponding control system functions or devices, respectively.

In a further preferred variant of the invention, the method is carried out when the switchgear assembly is in an on-line configuration phase. The method is used to determine configuration parameters for control system functions and communication units, which are loaded into the corresponding control system functions or devices, respectively.

Further preferred embodiments are described in the dependent patent claims.

BRIEF DESCRIPTION OF THE DRAWINGS

The subject matter of the invention will be explained in more detail in the following text with reference to a preferred exemplary embodiment, which is illustrated in the attached drawings, in which.

The reference symbols used in the drawings and their meanings are listed in summary form in the list of reference symbols. In principle, identical parts are provided with the same reference symbols in the figures.

DETAILED DESCRIPTION OF THE INVENTION

Figure 1:
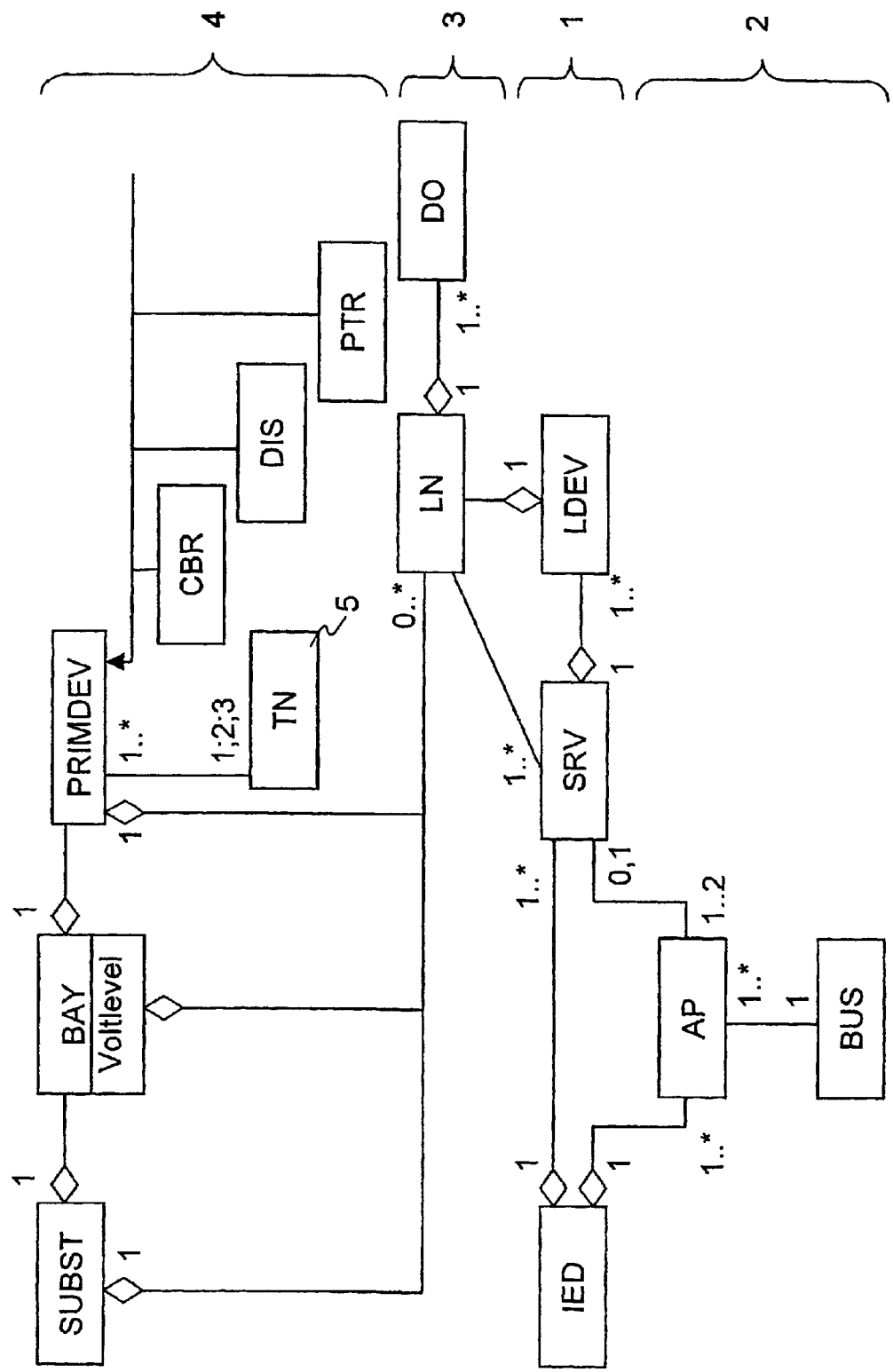
FIG. 1 shows a description of models used according to the invention based on UML (Unified Modeling Language) notation.

FIG. 1 shows a description of models used according to the invention based on a known UML (Unified Modeling Language) notation. In this case, connecting lines indicate a relationship or association between entities. Parallelograms at the end of a connecting line indicate a "content" relationship, while arrows indicate a "class-subclass" relationship. Digits at the end of relationships indicate how many entities are involved in a relationship, with a star (*) indicating a number greater than 1.

This model description defines relationships between a field device model, a communication model, a control function model, a primary device model and a topology model. These models are self-explanatory and represent corresponding systems and components of a switchgear assembly.

Thus, for example, when the following text refers to a "field device", then it is necessary to distinguish between:

1. an actual field device,
2. the field device model, which represents the actual field device in a data processing system or on a machine-readable storage medium, and
3. the model description for definition of contents and structures of field device models.

When not clear from the context, the distinction is indicated by appropriate prefixes or suffixes. Different reference symbols are also used on the basis of the above distinction, for example "CBR" in FIG. 1 for switches as elements of the model description and "QA1" in FIG. 2 for individual switches in the actual system and, respectively, for their representation in the field device model. An analogous situation applies to the communication means, control functions, primary devices and topology units.

The field device model describes individual field devices, and is itself described by a field device model description. Examples of field devices include a field control device or a subunit of an equipment cabinet with its own data processing unit, memory means and, possibly, associated sensors. According to the field device model description 1, a field device is represented by an IED ("Intelligent Electronic Device"). An Intelligent Electronic Device IED contains at least one server SRV, which provides data or functions to other devices or control system functions in accordance with a known client/server model. A server contains at least one logic device LDEV.

The communication model describes communication units or communication means in a communication system for the switchgear assembly, and is itself described by a communication model description 2. Communication units are network nodes AP and communication buses BUS. As can be seen from the model shown in FIG. 1, an Intelligent Electronic Device IED contains at least one network node AP. One or more network nodes AP are associated with a communication bus BUS.

The control function model describes control system functional elements, referred to as control system functions for short, and is itself described by a control function model description 3. The description is preferably based on IEC Standard 61850. The Standard defines, inter alia, control system functions for station control technology, and corresponding data types and communication links. The smallest unit of control system functions is also referred to, as in IEC Standard 61850, as a logical node or logic node LN. Such control system functions include, for example, program elements for actuating a switch or a disconnector, for overcurrent detection, for distance protection or for a reconnection function. One or more logic nodes LN are described in summary form as a logic device LDEV in the field device model. A function is implemented as a functional element or a program element, that is to say as computer program code, which can be stored and executed on a field device. A logic node LN contains data objects DO. Data objects DO represent one or more measured or calculated signal values or status attributes.

The primary device model describes primary devices, and is itself described by a primary device model description 4. Primary devices include, for example, switches CBR, disconnectors DIS or transformers PTR. A primary device PRIMDEV is associated with a switch field BAY, which is in turn associated with a substation SUBST.

The topology model describes topology units, and is itself described by a topology model description 5. The topology units and their relationships describe the topology of the high-voltage or medium-voltage parts of the switchgear assembly, and of links between substations. Topology units include, for example, field nodes, busbars or outgoers to power lines. A "topological node" TN model class combines a description of these units.

According to the invention, the various models are linked to one another: firstly, primary devices PRIMDEV and topological nodes TN are linked to one another so that interconnection between the actual primary devices can be represented via the actual topological units. These nodes, for example, two busbars, between which the switch is arranged, are allocated to an actual primary device, such as a switch. One or more topological nodes TN are allocated to it, depending on the nature of the primary device PRIMDEV. Secondly, logic nodes LN and primary devices PRIMDEV are associated with one another, so that it is possible to describe the way in which primary devices and control system functions are associated with one another.

Figure 2:
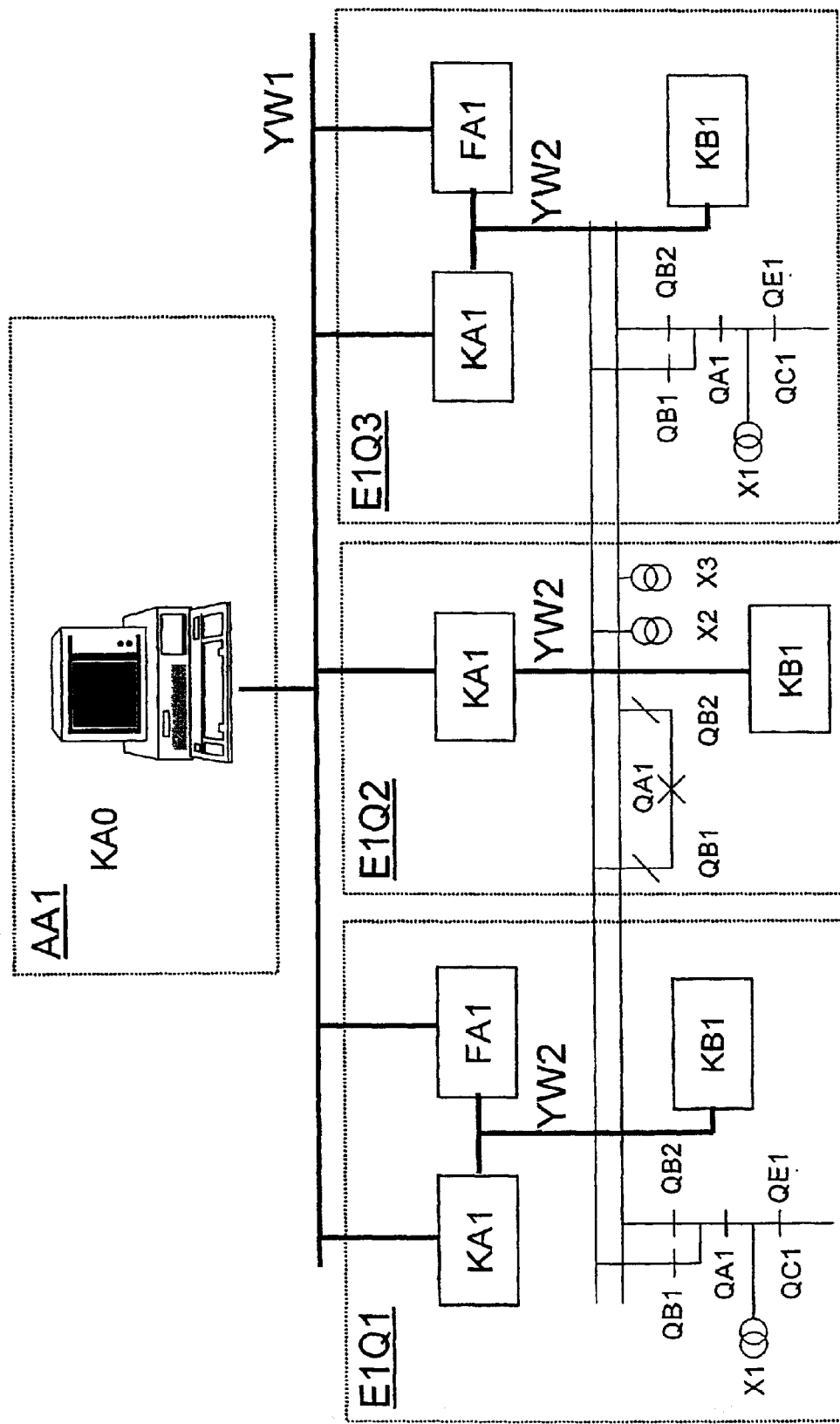
FIG. 2 shows a schematic illustration of a switchgear assembly and of an associated control system.

The method according to the invention will be explained by means of two examples with reference to FIG. 2. FIG. 2 shows a schematic illustration of a switchgear assembly and of an associated control system.

The illustration shows three fields E1Q1, E1Q2 and E1Q3 of a switchgear assembly, and an operator station AA1 having a data processing device KA0 with the normal input and output means for operation by a user. The individual fields E1Q1, E1Q2 and E1Q3 each have field devices, which are controllers KA1, protective devices FA1 or input/output devices KB1.

The terms such as AA1, KA1 etc. used here and in the following text match those in IEC Standard 61342, although a relationship with the method according to the invention is not essential. The terms KA1, FA1, KB1, YW1, etc. denote actual devices and control system functions for a system, and their representation in a data processing system. In order to identify a specific device uniquely, it is preceded by the designation of the field. For example, E1Q1QA1 denotes a switch QA1 in the field E1Q1.

Control system functions for controlling and monitoring the primary devices are installed on the field devices. The field devices are linked to one another by communication units, that is to say by means of a higher-level bus YW1 and by means of proces buses YW2. Primary devices, such as a switch QA1, disconnectors QB1, QB2 and voltage sensors or voltage measurement devices X1, X2, X3, are allocated to the control system functions. The primary devices are linked to one another by means of topology units, that is to say via busbars, field nodes and lines.

The configuration of a synchrocheck function will be described as the first example: this control system function checks the synchronization of voltages which are present on both sides of an open switch. The switch is not allowed to close unless there is a predetermined match between the voltages. In order to configure a synchrocheck function for a predetermined control system function, which is a switch control function for the switch QA1 and is carried out on the device KA1 in the field E1Q1, the method according to the invention is carried out as follows:

a) A user input or a higher-level configuration system determines that the synchrocheck function to be installed as new is associated with the switch QA1 in the field E1Q1.

b) In the same way, the synchrocheck function is associated with a field device on which the control system function is intended to be installed and carried out.

c) A software unit or a software agent with which the synchrocheck function is associated has a representation of information (which the control system function requires) or implements a method for determining this information. In this situation, the software agent determines with which further control system functions the synchrocheck function must communicate in order to carry out its task. The synchrocheck function requires measured values from voltage sensors which detect the voltages on both sides of the switch. The software agent uses the topology model to determine that there is a voltage sensor X1 located on one side of the switch. No voltage sensor is located in the field E1Q1 on the other side of the switch. As the software agent searches systematically through the topology model starting from the switch, it determines that the sought voltage is present on one of the voltage sensors X2 or X3, depending on whether a disconnector QB1 or QB2 is closed. In consequence, firstly the physical voltage sensors are known and, secondly, it is known which voltage sensor must be taken into account during operation of the system, depending on the states of the disconnectors QB1 and QB2. On the basis of the association, which is known from the system model, between primary devices and control system functions, it is known which control system functions supply the state of the disconnectors QB1 and QB2 and the voltages of the voltage sensors X2 and X3 during operation. The software agent thus determines that control system function which carries out detection and preprocessing of the measured values from the voltage sensors. In this case, these are measurement functions which are carried out in the device KA1 in the field E1Q2. A communication address is thus also known for each of these measurement functions. Since standardized semantics are used for function descriptions, such as those defined in IEC Standard 61850, the control system function and software agents can be developed independently of one another.

d) If the method according to the invention is carried out off-line using an engineering tool, these communication addresses are used to configure a communication link between the synchrocheck function and the measurement functions, for example by entries in signal tables. When the switchgear assembly is subsequently brought into use, such configuration data can be loaded into the corresponding control system functions or controllers and communication units. If the method is carried out when the switchgear assembly is in an on-line configuration phase, the communication addresses are entered or loaded, respectively, in the relevant control system functions and communication units. For example, the entry for measurement functions is that they have to transmit their measurement data to a specific address, which is an address for the synchrocheck function. Conversely, the entry for the synchrocheck function is that the required data are obtained from the transmitter addresses, corresponding to the measurement functions.

e) In an analogous manner, a communication link is also set up between the synchrocheck function and the switch control function for the corresponding primary device, via which an enable signal for closing the associated switch QA1 is transmitted to the switch control function.

The configuration of an interlock function for a disconnector will be described as the second example. A disconnector may be opened only when no current is flowing in the link to be disconnected. This is ensured if the present positions of switches and disconnectors in the system satisfy specific conditions. EP-A-0 224 711 describes how these conditions are determined automatically on the basis of a system topology model. In order to check these conditions during system operation, the interlock function requires the already-mentioned present positions of switches and disconnectors. In accordance with the method according to the invention:

a) as in the first example, the interlock function to be configured is first of all allocated to a primary device, in this case a disconnector, for example QB1, and to a field device.

b) As described in the cited patent EP-A-0 224 711, the topology model is used to determine those switches and/or disconnectors whose position is required, and the conditions for logical linking of their position information are determined.

c) The modeled association between primary devices and control system functions is used to determine the corresponding control functions of the switches and disconnectors, which have this required position information.

d) As described in the first example, communication links are configured or set up, respectively between the control functions of the switches and/or disconnectors, and the interlock function.

In one preferred variant of the method according to the invention, data from the primary device model and/or from the topology model are used to determine configuration parameters for a control system function. For example, monitoring limit values for measured values are set automatically in a monitoring function for the control system based on rating data for a transformer which are included in the primary device model. Measured values such as these are, for example, voltages applied to the transformer, or a volt-amperes level transmitted through the transformer. Further examples for this variant of the method according to the invention are:

Automatic calculation of scaling parameters which, for example, convert a measured value detected in 16-bit integer form into SI units, on the basis of data from a measurement device.

The delay time of a switch is used to automatically set a time limit for its delay-time monitoring.

Protection parameters for cable protection functions are determined from the rating data for a cable.

A computer program product according to the invention has a stored program code, which carries out the described method for configuration of a control system for an electrical switchgear assembly, during operation, on a data processing unit or on one or more computers.

List of Reference Symbols

1 Field device model description
2 Communication model description
3 Control function model description
4 Primary device model description
5 Topology model description
AP Network node
BAY Switch field
BUS Communication bus
CBR Switch
DIS Disconnector
DO Data object IED Intelligent Electronic Device
LDEV Logic device
LN Logic node
PRIMDEV Primary device
PTR Transformer
QA1 Switch
QB1 Disconnector
SRV Server
SUBST Substation
TN Topological node, element in the topology model
X1, X2, X3 Voltage sensors
YW1 Higher-level bus
YW2 Process bus
KA1 Controller
FA1 Protective device
KB1 Input/output device

What is claimed is:

1. A method for configuration of a control system for an electrical switchgear assembly, which uses a field device model for representation of field devices, and a control function model for representation of control system functions of the switchgear assembly, wherein the method uses a primary device model for representation of primary devices in the switchgear assembly, and a topology model of the switchgear assembly, and comprises the following steps:
a) association of a first control system function with a primary device by means of the primary device model,
b) association of the first control system function with a field device by means of the field device model,
c) automatic determination of second control system functions, which the first control system function requires during operation of the assembly, on the basis of the topology model.

2. The method as claimed in claim 1, wherein the method uses a communication model for representation of communication means, and, as a further step comprises:
d) automatic determination of communication links between the first control system function and the second control system functions on the basis of the communication model.

3. The method as claimed in claim 1, wherein a control system function is allocated a software agent for configuration of the control system function, which determines a representation of information, which information the control system function requires, and which carries out the automatic determination of the second control system functions.

4. The method as claimed in claim 1, wherein the method is carried out when the switchgear assembly is in an off-line engineering phase, and, when the method is being carried out, configuration parameters are determined for control system functions and communication units and can be loaded into the corresponding control system functions or communication units, respectively.

5. The method as claimed in claim 1, wherein the method is carried out when the switchgear assembly is in an on-line configuration phase, and, when the method is being carried out, configuration parameters of control system functions and communication units are determined and are loaded into the corresponding control system functions or communication units, respectively.

6. The method as claimed in claim 1, wherein configuration parameters for a control system function are determined on the basis of data from the primary device model and/or from the topology model.

7. A computer program product having a stored program code which, during operation on a data processing unit, carries out a method for configuration of a control system for an electrical switchgear assembly, which method uses a field device model for representation of field devices, and a control function model for representation of control system functions of the switchgear assembly, wherein the method uses a primary device model for representation of primary devices in the switchgear assembly, and a topology model of the switchgear assembly, and comprises the following steps:
a) association of a first control system function with a primary device by means of the primary device model,
b) association of the first control system function with a field device by means of the field device model,
c) automatic determination of second control system functions, which the first control system function requires during operation of the assembly, on the basis of the topology model.

8. The computer program product as claimed in claim 7, wherein the method which is carried out uses a communication model for representation of communication means and, as a further step, comprises:
d) automatic determination of communication links between the first control system function and the second control system functions on the basis of the communication model.

* * * * *